(12) United States Patent
DeGroot et al.

(10) Patent No.: US 7,658,178 B2
(45) Date of Patent: Feb. 9, 2010

(54) ENGINE EVENT-BASED CORRECTION OF ENGINE SPEED FLUCTUATIONS

(75) Inventors: Kenneth P. DeGroot, Macomb Township, MI (US); Jeffrey P. Wuttke, Sterling Heights, MI (US); Gerald Lee Kennie, Marysvlle, MI (US); Dennis W. Fett, Clinton Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 102 days.

(21) Appl. No.: 11/759,447

(22) Filed: Jun. 7, 2007

(65) Prior Publication Data
US 2008/0302331 A1 Dec. 11, 2008

(51) Int. Cl.
F02P 5/06 (2006.01)
(52) U.S. Cl. ............... 123/406.24; 123/406.5; 701/111
(58) Field of Classification Search ................
123/406.23–406.36, 436, 491–493, 406.46, 123/406.5; 701/111
See application file for complete search history.

(56) References Cited

U.S. PATENT DOCUMENTS

| | | | | |
|---|---|---|---|---|
| 4,683,856 A * | 8/1987 | Matsuura et al. | ....... | 123/406.24 |
| 4,776,312 A * | 10/1988 | Yoshioka et al. | ............ | 123/436 |
| 4,915,079 A * | 4/1990 | Holmes | ................. | 123/406.24 |
| 5,313,826 A * | 5/1994 | Klauber et al. | ............ | 73/114.15 |
| 5,584,276 A * | 12/1996 | Tomisawa | ............... | 123/406.24 |
| 5,675,094 A * | 10/1997 | Klauber et al. | ......... | 73/862.191 |
| 5,765,528 A | 6/1998 | Kamimaru | | |
| 5,809,969 A * | 9/1998 | Fiaschetti et al. | ............ | 123/436 |
| 6,109,237 A | 8/2000 | Pels et al. | | |
| 6,152,105 A * | 11/2000 | Nishimura et al. | ...... | 123/339.11 |
| 6,237,327 B1 * | 5/2001 | Nishimura et al. | ............. | 60/276 |
| 6,298,838 B1 * | 10/2001 | Huff et al. | .................... | 123/674 |
| 6,378,492 B1 | 4/2002 | Liu | | |
| 6,415,766 B1 | 7/2002 | Kanno et al. | | |
| 6,457,455 B2 * | 10/2002 | Baeuerle et al. | ......... | 123/406.24 |
| 6,655,350 B2 | 12/2003 | Kamoto | | |
| 6,659,079 B2 | 12/2003 | Price | | |
| 6,817,338 B2 | 11/2004 | Janic et al. | | |
| 6,820,589 B2 | 11/2004 | Okubo et al. | | |
| 6,935,306 B2 | 8/2005 | Sumilla et al. | | |
| 6,941,927 B2 | 9/2005 | Almkvist et al. | | |
| 7,377,261 B2 * | 5/2008 | Sukegawa et al. | ...... | 123/406.55 |

* cited by examiner

Primary Examiner—Hai H Huynh
(74) Attorney, Agent, or Firm—Ralph E. Smith

(57) ABSTRACT

Ignition timing for a combustion engine may be controlled by determining the roughness of current engine operation, comparing the determined roughness with a control roughness to determine if the determined roughness is within a threshold limit of the control roughness, and changing the ignition timing in a subsequent fuel delivery event as a function of the difference between the determined roughness and the control roughness. Preferably, the ignition timing is changed at least when the determined roughness is not within the threshold limit, although other factors may be taken into account when changing the ignition timing.

17 Claims, 3 Drawing Sheets

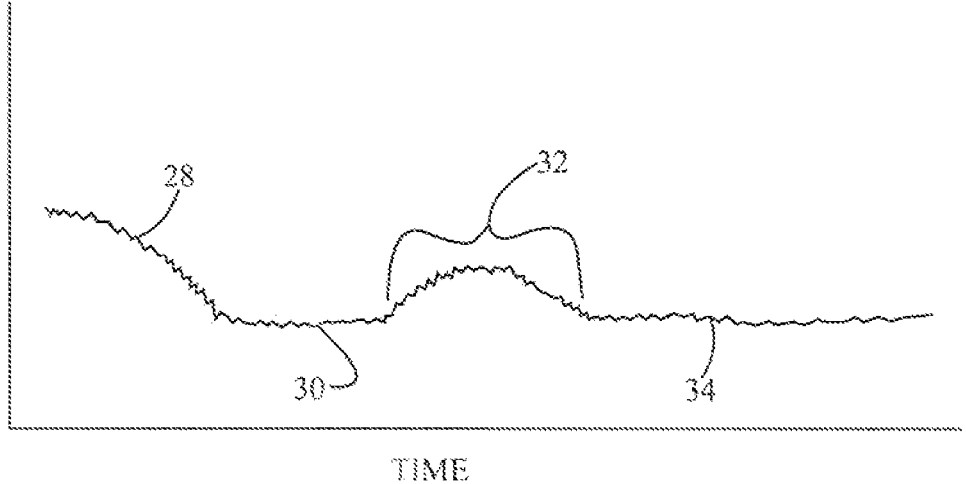
FIG. 5 - PRIOR ART
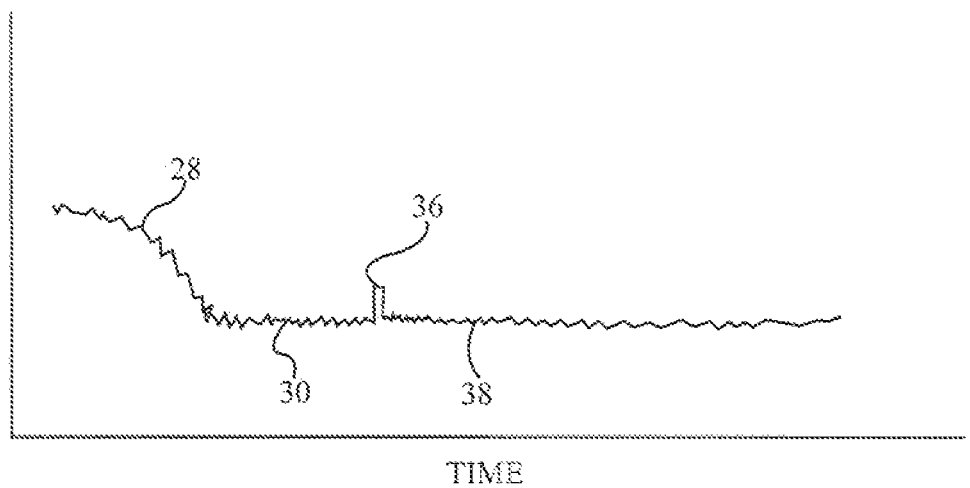
FIG. 6
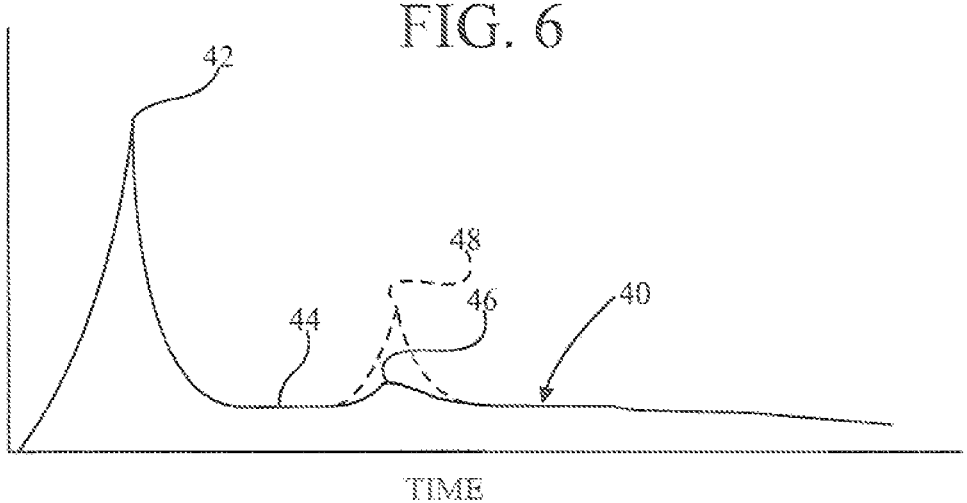
FIG. 7

ENGINE EVENT-BASED CORRECTION OF ENGINE SPEED FLUCTUATIONS

FIELD OF THE INVENTION

The present invention relates generally to internal combustion engines and more particularly to correction of engine speed fluctuations.

BACKGROUND OF THE INVENTION

Automotive vehicles may employ a fuel injected internal combustion engine in which a fuel injector discharges fuel into air in an intake manifold or combustion chamber of the engine and a spark plug ignites the fuel and air in the combustion chamber. The conventional fuel injector typically is controlled and responds to a fuel injection pulse width signal, which determines an amount of fuel injected. The fuel injection pulse width signal can be implemented to follow a programmed curve or algorithm, which is generally utilized to provide adequate engine performance when feedback or closed-loop engine control is not available. Similarly, the conventional spark plug typically is controlled and responds to an ignition timing signal that determines when the spark plug is activated. The ignition timing signal can be implemented to follow a programmed timing map, which is generally utilized to provide adequate engine performance when feedback or closed-loop engine control is not available.

Automotive vehicles may employ an oxygen sensor generally disposed upstream of an exhaust system and capable of sensing the oxygen level in the exhaust gas emitted from the engine. The oxygen sensor can provide a feedback signal used in controlling engine operation and adjusting fuel injection and ignition timing. However, at least some oxygen sensors need to warm up to a sufficiently high temperature before an accurate oxygen sensor reading may be obtained. Also, in the period immediately following an engine start, the oxygen sensor and other devices may not have acquired enough information to provide adequate feedback control. Therefore, for a period of time immediately following a cold start up of the vehicle engine, the oxygen sensor may not be capable of providing accurate information with which the engine may be controlled. As a consequence, undesirable hydrocarbon emissions may be emitted from the vehicle within the period immediately following start-up of the engine.

Additionally, immediately following a cold engine start, the catalyst of a catalytic converter can be ineffective since the catalyst may require a period of time to warm up to a temperature at which the catalyst can operate effectively. As a consequence, hydrocarbon emissions may be even higher during initial engine operation, especially after a cold start.

SUMMARY OF THE INVENTION

Ignition timing of a combustion engine may be controlled by determining the roughness of current engine operation, comparing the determined roughness with a control roughness to determine if the determined roughness is within a threshold limit of the control roughness, and changing the ignition timing of the engine in a subsequent ignition timing event as a function of the difference between the determined roughness and the control roughness. Preferably, the ignition timing is changed at least when the determined roughness is not within the threshold limit, although other factors may be taken into account when changing the ignition timing.

In one presently preferred implementation, the ignition timing change is made as a function of the difference between the determined roughness and the threshold limit. Further, the ignition timing change may be made for a single subsequent combustion event in the engine. In other words, the ignition timing change may be made for an ignition timing event into a single engine cylinder after the determination has been made to change the ignition timing of the engine for combustion. Thereafter, the roughness of the current engine operation may again be compared to the control roughness to determine if subsequent changes to the ignition timing are required. In this manner, discrete changes in ignition timing can be made, such as in discrete or individual cylinder combustion events, to bring the engine operation into threshold limits for roughness. Desirably, the engine roughness during initial operation after a cold start of the engine can be maintained relatively low while achieving reduced hydrocarbon emissions from the vehicle.

BRIEF DESCRIPTION OF THE DRAWINGS

Exemplary embodiments of the present disclosure will become more fully understood from the detailed description and the accompanying drawings, in which:

FIG. 5 is a graph that diagrammatically illustrates prior art conventional ignition timing after cold start of an engine;

FIG. 6 is a graph that diagrammatically illustrates ignition timing including a combustion change event such as a change in ignition timing; and FIG. 7 is a graph illustrating the difference between hydrocarbon emissions with and without the presently disclosed method(s).

DETAILED DESCRIPTION OF PREFERRED EMBODIMENTS

Figure 1:
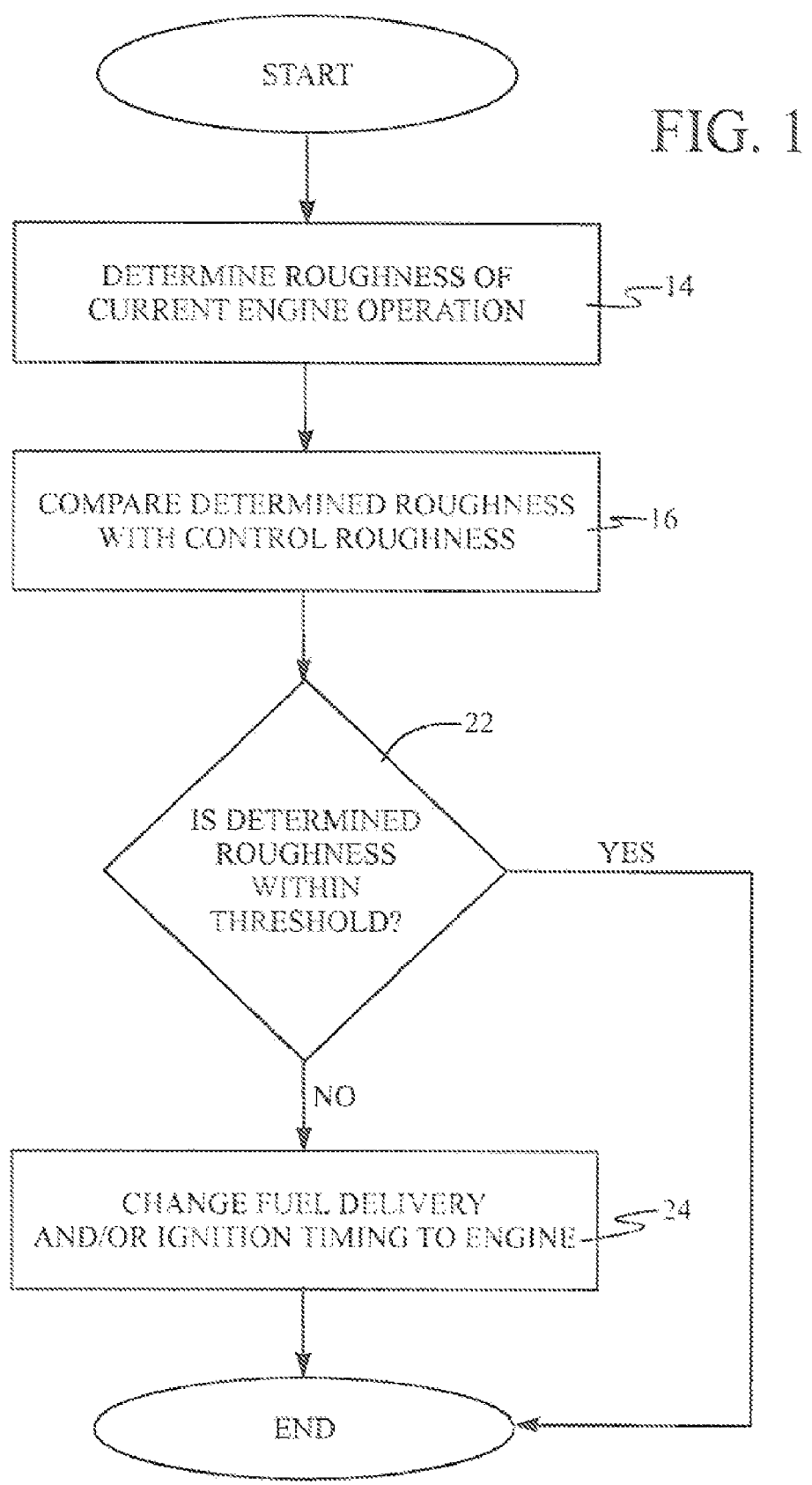
FIG. 1 is a flow diagram illustrating a method of determining whether change to ignition timing and/or the rate of fuel delivery to the engine is needed.
Figure 2:
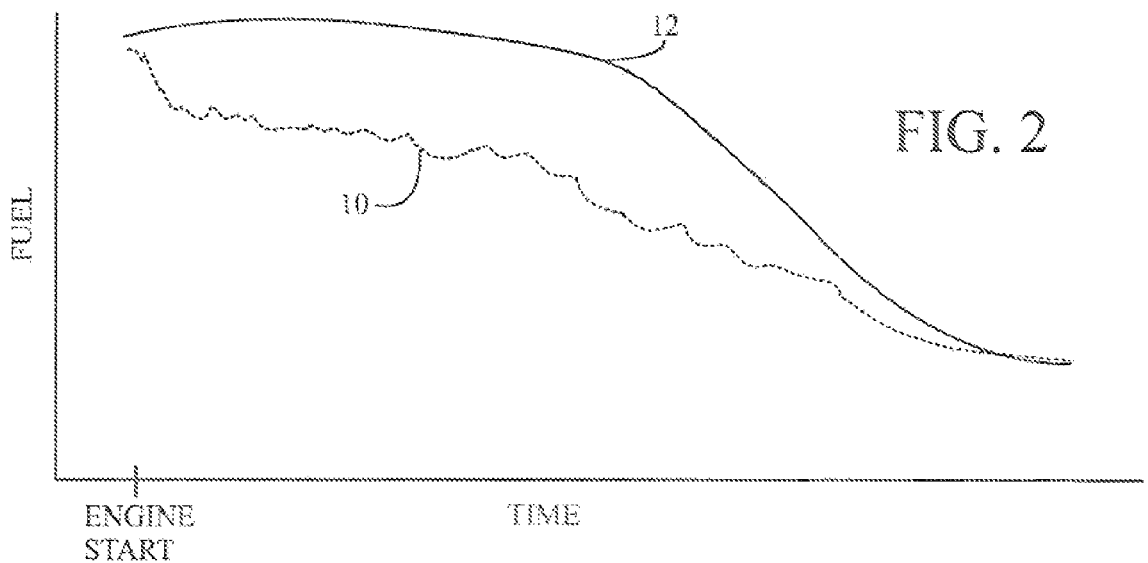
FIG. 2 is a graph illustrating, in general fashion, the difference between a stoichiometric fuel curve and a desired fuel curve for initial operation after cold start of an engine.

Referring in more detail to the drawings, FIG. 1 generally illustrates a process by which an engine fuel injection event and/or engine ignition timing event can be modified as a function of current engine operation. In one presently preferred implementation, the process is employed during initial cold start of an engine, although the process may be employed otherwise during operation of the engine, including after a hot start, or otherwise as desired. Vehicles can emit a substantial amount of hydrocarbons to the atmosphere during initial engine operation. Accordingly, in at least some engines and in some engine applications, it may be desirable to provide a relatively lean fuel and air mixture into the engine cylinders for combustion. The relatively lean fuel and air mixture may contain less fuel than a stoichiometric value for combustion as shown in FIG. 2 where line 10 represents a desired lean mixture and line 12 represents a stoichiometric mixture. However, if the fuel and air mixture is too lean, the engine may not operate properly, and the hydrocarbon emissions may actually increase.

During normal engine operation, the fuel delivery may be subject to closed-loop control including feedback from one or more sensors. One such sensor may be an oxygen sensor and another maybe a manifold absolute pressure (MAP) sensor. The oxygen sensor may be connected to an engine controller and adapted to sense the oxygen level in exhaust gas emitted from the engine. The MAP sensor may be communicated with an intake manifold and the engine controller and adapted to sense pressure within the manifold. Of course, other sensors may be employed to provide feedback indicative of engine operation. During initial engine operation after at least a cold start, the oxygen sensor may not be effective to provide feedback for closed-loop engine control. The oxygen sensor may not be effective to provide feedback until it has been sufficiently warmed up and, accordingly, it may not be possible to control initial engine operation, for example after a cold start, as a function of the oxygen in the engine exhaust.

Accordingly, during initial engine operation after a cold start, and otherwise as desired, an open loop control system may be employed to control ignition timing and/or fuel delivery to the engine. The fuel delivery to the engine may be controlled as a function of the roughness of the engine operation. The roughness of the engine operation may be determined in accordance with U.S. Pat. No. 5,809,969, the disclosure of which is incorporated herein by reference in its entirety. In general terms, the engine speed for a particular combustion event in an engine cylinder is compared to the engine speed from a different combustion event in a different cylinder. The difference between these values may be identified as an acceleration estimate value, which may be compared with previous acceleration estimate values to provide a jerk estimate value. The jerk estimate value may be representative of a combustion metric value, which is a learned value indicative of the combustion stability of the engine, and therefore, indicative of the roughness of the engine combustion and current engine operation. The average combustion metric value of current engine operation may be compared with a desired combustion metric value (which may be preprogrammed in the controller) and the difference between these values may be used to provide a modification to ignition timing and/or the rate at which fuel is delivered to the engine for subsequent combustion events. This may be done, for example, by relatively advancing or retarding ignition timing and/or by varying a fuel injection pulse width to control the amount of fuel injected by a fuel injector into the engine.

Figure 3:
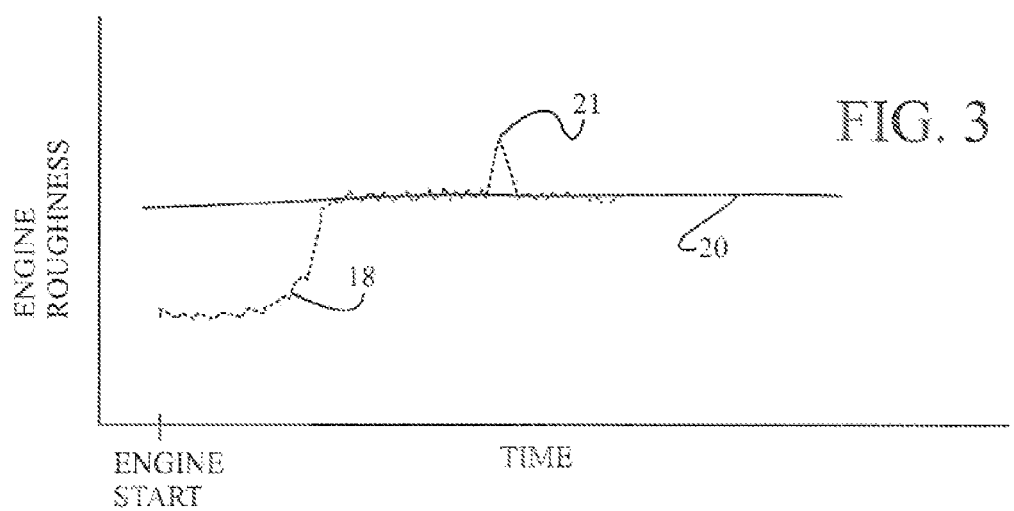
FIG. 3 is a graph that diagrammatically illustrates a comparison of a desired roughness value with an actual determined roughness value of current engine operation.

Referring again to FIG. 1, after the roughness of current engine operation is determined at 14, that determined roughness is compared to a control engine roughness at 16, which may be predetermined and programmed in a controller. FIG. 3 illustrates a diagrammatic comparison of instantaneous engine roughness at line 18 compared to a control engine roughness at line 20 after initial engine start and over a limited time of engine operation after start. At 22 it is determined if the engine roughness is higher than the control roughness (e.g. as shown by spike or peak 21 in FIG. 3). If it is, a change to the ignition timing and/or delivery of fuel to the engine for a subsequent combustion event is implemented at 24. The change may be implemented as a function of the magnitude of the difference between the current engine roughness and the control engine roughness. The control roughness may itself provide a threshold limit above which an ignition timing or fuel delivery modification event occurs, or the control roughness may be a target or desired roughness and a threshold or tolerance may be provided somewhat above the desired engine roughness. In other words, the threshold may be set so that a modification to the ignition timing and/or delivery of fuel to the engine occurs when the current engine roughness is above the control engine roughness by a certain factor or amount, for example, when the current engine roughness is greater than 5% higher than the control engine roughness. Of course, other values or ways of setting threshold may be employed, as desired for a particular application.

The change to the ignition timing and/or amount of fuel delivered to an engine cylinder for a subsequent combustion event may be made based on a number of factors. Some of those factors, without limitation, include current engine speed, and the magnitude of the difference between current engine roughness and control engine roughness. The change in the ignition timing and/or fuel delivery to the engine may be made for a single engine cylinder combustion event, or for multiple subsequent engine cylinder combustion events, as desired. It may be possible, to bring the engine roughness to, below, or within the control engine roughness, by modifying a single engine cylinder combustion event.

Figure 4:
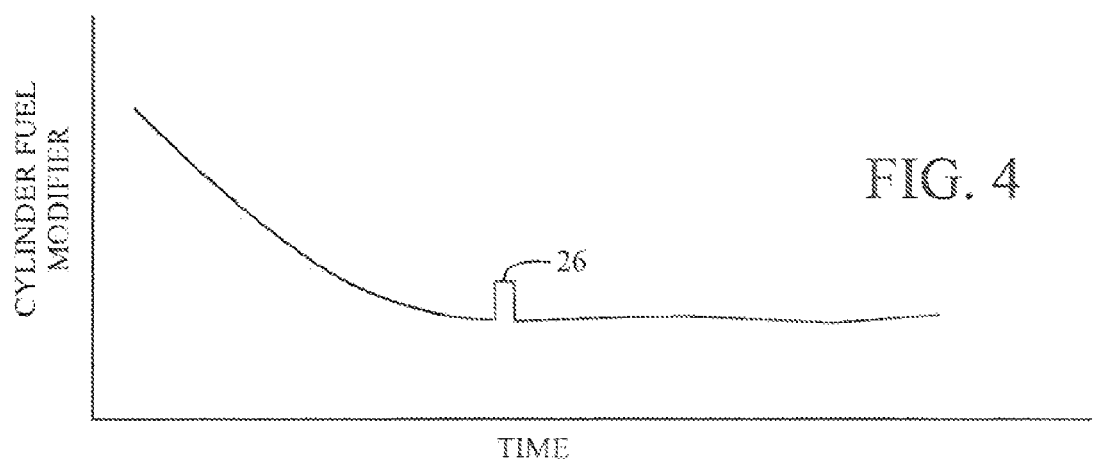
FIG. 4 is a graph that diagrammatically represents a fuel curve including a combustion change event such as a change in ignition timing or fuel delivery.

Such a discrete change in fuel delivery is diagrammatically illustrated in FIG. 4 with a spike change 26 in fuel delivery shown for a single engine cylinder fuel delivery event. In this manner, a relatively limited and discrete change to the fuel delivery to the engine can be made to improve engine operation without significantly increasing the hydrocarbon emissions from the engine. The change to the amount of fuel delivered to the engine may include adding more fuel than what would otherwise be added, as shown in FIG. 4, or adding less fuel than what would otherwise be added. Typically, because the fuel delivery to the engine is lean during initial engine operation, more fuel will be added to the engine by the modification of this process than what would otherwise be delivered to the engine without this modification.

Referring now to prior art FIG. 5, conventional ignition timing is plotted to illustrate how ignition timing is changed in response to engine roughness. First, numeral 28 indicates a reduction in ignition timing immediately following engine start up. For example the reduction 28 may be a reduction in spark advance from, for example 35° BTDC, to a relatively stable portion 30 at about 15° BTDC. In response to the engine roughness, ignition timing is typically subjected to an increase 32 over a plurality of combustion events, such as twenty to thirty subsequent events. After the increase 32, the ignition timing again stabilizes as shown at 34.

Ignition timing may be established in any suitable manner such as by any models, like formulas, look up tables, maps, or the like. For example, a base ignition timing model may be used to output base ignition timing to ignite a fuel and air mixture in accordance with desired combustion characteristics. Ignition timing generally means the engine crankshaft angle at which an ignition spark occurs so as to ignite the fuel and air mixture at a desired point during an engine cycle. The engine cycle includes a combustion event in the form of ignition, for example, wherein a spark plug ignites the air-fuel mixture. Timing of the ignition event relates to how early or late a spark plug fires relative to the location of the piston within the cylinder in reference to TDC.

Ignition timing is "advanced" if ignition occurs BTDC, and is "advancing" or "being advanced" whenever timing is being adjusted relatively away from ATDC or TDC in a direction toward a greater position BTDC. For example, ignition is said to be advanced when it is changed from 10° BTDC to 25° BTDC, or from 4° ATDC to 2° ATDC. Conversely, ignition timing is "retarded" if ignition occurs ATDC, and is "retarding" or "being retarded" whenever timing is being adjusted relatively away from BTDC or TDC in a direction toward a greater position ATDC. For example, ignition is said to be retarded when it is changed from 2° ATDC to 4° ATDC, or from 25° BTDC to 10° BTDC.

A discrete change in ignition timing is diagrammatically illustrated in FIG. 6 with a change 36 in timing shown for a single engine cylinder ignition event. Following the change 36, ignition timing may be stabilized at 38. In this manner, a relatively limited and discrete change to the engine ignition timing can be made to improve engine operation without significantly increasing the hydrocarbon emissions. Also, the change 36 can be repeated for one or more subsequent combustion events but preferably for less combustion events than, a typical conventional increase 32 in ignition timing shown FIG. 5.

The change to the ignition timing may include advancing the timing for earlier combustion or retarding the timing for later combustion. Typically, because the fuel delivery to the engine is lean during initial engine operation and the engine may, thus, run rough, ignition timing may be advanced from what it would otherwise be without this modification. But, if more fuel will be added to the engine by the above described fueling modification than what would otherwise be delivered to the engine without that modification, then ignition timing may be retarded from what it would otherwise be without these ignition timing and fueling modifications.

Ignition timing may be advanced or retarded in response to engine roughness in any suitable manner. For example, instead of using the base ignition timing model, a different model could be used, such as an advanced ignition timing model or a retarded ignition timing model. In another example, an ignition timing model, such as the base ignition timing model, could be used and an output ignition timing value from that model could be manipulated in any suitable fashion for advancing or retarding ignition timing. In any case, the advanced or retarded ignition timing may be calibrateable to achieve desired emissions, engine roughness, and cold start feel consumption.

After an engine cylinder combustion event has been modified by way of changing the ignition timing and/or amount of fuel delivered to that engine cylinder, the process may be started over for a subsequent engine cylinder event to determine if the engine roughness is within a desired operational range or if a subsequent fuel injection event is to be modified as set fourth herein. In other words, the process may modify a single engine cylinder combustion event, and then the process may be run again to determine the engine roughness and, as a function thereof, whether a subsequent engine cylinder combustion event should be modified.

This process may be ran until the closed-loop feedback control of the engine fuel delivery can be reliably accomplished. This may occur after the oxygen sensor has sufficiently warmed up, or after a preset interval of time, for example, 10, 20, 30 or 40 or more seconds. Even alter starting a relatively warm engine, where the oxygen sensor may be at a sufficient temperature for its effective operation, it may take a period of time before reliable closed-loop engine feedback control can be accomplished. In this situation, the fuel can be controlled as a function of the engine roughness as set forth herein. Still further, it may be desirable in at least some applications to run the engine somewhat leaner than stoichiometric ratios, even after the engine and oxygen sensor are sufficiently warmed up. In such situations, the engine can be controlled in accordance with the process set forth herein. Of course, there may be still other situations in which a process as set forth herein may be desirable to control the fuel delivery to the engine.

FIG. 7 illustrates a plot of hydrocarbon emissions 40 as a result of using one or more of the presently disclosed methods. The plot 40 includes an initial peak 42 of emissions immediately following cold start of an engine, a stabilized portion 44 following the peak 42, and a slight bump 46 in emissions as a result of the engine roughness 21 of FIG. 3. The slight bump 46 should be compared to a significant peak 48 (dashed lines) in emissions that would ordinarily be experienced without one or more of the presently disclosed methods.

FIGS. 2 through 7 include plots of some variable along the Y-axis against time along the X-axis. The X-axis time may include engine position pulses (EPPs), wherein the spike changes 26, 36 (FIG. 4, FIG. 6) in fuel delivery and in ignition timing are shown for a single engine cylinder fuel delivery or ignition timing event and one or more EPPs.

While certain presently preferred implementations of a method of controlling fuel delivery to an engine have been shown and described, persons of ordinary skill in this art will recognize that the preceding disclosure has been set forth in terms of description rather than limitation, and that various modifications and substitutions can he made without departing from the spirit and scope of the invention. Methods of controlling engine operation embodying the present invention may have none, some or all of the noted features and/or advantages set forth in this disclosure. That certain features are shared among the presently preferred embodiments set forth herein should not be construed to mean that all embodiments of the present invention must have such features.

What is claimed is:

1. A method of controlling ignition timing for a combustion engine, comprising:
   determining roughness of current engine operation;
   comparing the determined roughness with a predetermined control roughness to determine if the determined roughness is within a threshold limit of the control roughness;
   changing ignition timing of the engine for a subsequent ignition event as a function of the difference between the determined roughness and the control roughness at least when the determined roughness is not within said threshold limit;
   wherein the roughness of current engine operation is determined as a function of changes in engine speed associated with combustion in individual cylinders of the engine; and
   wherein the engine speed after a selected combustion event in one engine cylinder is compared to the engine speed after a subsequent combustion event in a different engine cylinder.

2. The method of claim 1 wherein the ignition timing is changed as a function of the difference between the determined roughness and the threshold limit.

3. The method of claim 1 wherein the ignition timing is changed as a function of the difference between the determined roughness and the threshold limit for a subsequent combustion event in the engine.

4. The method of claim 1 wherein the ignition timing is changed for a single combustion event in an engine cylinder and the method is repeated to determine if the ignition timing should be changed for another combustion event.

5. The method of claim 1 wherein the control roughness is equal to the threshold limit so that ignition timing is changed if the determined roughness is greater than the control roughness.

6. The method of claim 1 wherein the threshold limit is greater than the control roughness so that ignition timing is changed when the determined roughness is greater that the threshold limit.

7. The method of claim 1 wherein the ignition timing is retarded when increases in engine speed increase engine roughness beyond the threshold limit and is advanced when decreases in engine speed increase engine roughness beyond the threshold limit.

8. The method of claim 1 wherein the method is carried out upon cold start of the engine and before closed loop control of ignition timing based on feedback from one or more sensors.

9. A method of controlling combustion in an internal combustion engine, comprising:
sensing engine speed for each expected firing of individual cylinders of the internal combustion engine;
determining a difference in engine speed for a selected cylinder firing and a cylinder firing occurring prior to the selected cylinder firing, said difference in engine speed providing an acceleration estimate value;
determining a difference between a current acceleration estimate value and a preceding acceleration estimate value to provide an acceleration difference value;
determining roughness of current engine operation as a function of the acceleration difference value;
comparing the determined roughness with a control roughness to determine if the determined roughness is within a threshold limit of the control roughness; and
controlling combustion of the internal combustion engine as a function of the difference between the determined roughness and the control roughness at least when the determined roughness is not within said threshold limit.

10. The method of claim 9 wherein the ignition timing is changed as a function of the difference between the determined roughness and the threshold limit.

11. The method of claim 9 wherein the ignition timing is changed for a subsequent combustion event in the engine.

12. The method of claim 9 wherein the ignition timing is changed for a single combustion event in an engine cylinder and the method is repeated to determine if the ignition timing should be changed for another combustion event.

13. The method of claim 9 wherein the control roughness is predetermined and equal to the threshold roughness limit so that ignition timing is changed if the determined roughness is greater than the control roughness.

14. The method of claim 9 wherein the threshold limit for roughness is greater than the control roughness so that ignition timing is changed when the determined roughness is greater than the threshold limit.

15. A method of controlling combustion for a combustion engine, comprising:
determining roughness of current engine operation;
comparing the determined roughness with a control roughness to determine if the determined roughness is within a threshold limit of the control roughness;
changing ignition timing and fuel delivery to the engine for a subsequent ignition event as a function of the difference between the determined roughness and the control roughness at least when the determined roughness is not within said threshold limit; and
wherein the determined roughness is determined Using an acceleration estimate value based on engine combustion events in two different cylinders.

16. The method of claim 15 wherein the acceleration estimate value is based on a difference between engine speed in one engine cylinder for one combustion event and engine speed in another engine cylinder for another combustion event.

17. The method of claim 16 wherein the acceleration estimate value is compared to at least one other prior acceleration estimate value in determining a jerk estimate value that is used in determining determined roughness.

\* \* \* \* \*